US011412123B2

(12) United States Patent
Sherman et al.

(10) Patent No.: US 11,412,123 B2
(45) Date of Patent: Aug. 9, 2022

(54) IMAGE PROCESSING FOR CAMERA BASED VEHICLE DISPLAY SYSTEM

(71) Applicant: Gentex Corporation, Zeeland, MI (US)

(72) Inventors: Tom B. Sherman, Ada, MI (US); Daniel G. McMillan, Zeeland, MI (US); Gregory S. Bush, Grand Rapids, MI (US)

(73) Assignee: GENTEX CORPORATION, Zeeland, MI (US)

(\*) Notice: Subject to any disclaimer, the term of this patent is extended or adjusted under 35 U.S.C. 154(b) by 733 days.

(21) Appl. No.: 15/072,775

(22) Filed: Mar. 17, 2016

(65) Prior Publication Data

US 2016/0277651 A1 Sep. 22, 2016

Related U.S. Application Data

(60) Provisional application No. 62/135,417, filed on Mar. 19, 2015.

(51) Int. Cl.
*H04N 5/225* (2006.01)
*H04N 7/18* (2006.01)
(Continued)

(52) U.S. Cl.
CPC ............ *H04N 5/2259* (2013.01); *B60R 1/00* (2013.01); *G06V 10/44* (2022.01); *G06V 20/56* (2022.01);
(Continued)

(58) Field of Classification Search
CPC .. H04N 5/2259; H04N 5/23293; H04N 7/183; B60R 1/00; B60R 2300/605; B60R 2300/8066; G06K 9/00791; G06K 9/4604
(Continued)

(56) References Cited

U.S. PATENT DOCUMENTS

| 7,565,006 B2 | 7/2009 | Stam et al. |
| 7,881,839 B2 | 2/2011 | Stam et al. |

(Continued)

FOREIGN PATENT DOCUMENTS

| JP | 55047782 A | 4/1980 |
| JP | 06321011 A | 11/1994 |

(Continued)

OTHER PUBLICATIONS

International Search Report and Written Opinion of the International Searching Authority dated Jul. 18, 2016, for International Application No. PCT/US2016/022905, filed Mar. 17, 2016.
(Continued)

*Primary Examiner* — Ayman A Abaza
(74) *Attorney, Agent, or Firm* — Price Heneveld LLP; Brian James Brewer

(57) ABSTRACT

A display system for a vehicle comprises an imager configured to capture image data in a field of view rearward relative the vehicle. The system further comprises a display device and a controller. The display device comprises a screen disposed in a passenger compartment of the vehicle. The controller is in communication with the imager and the display device. The controller is operable to process the image data to identify at least one feature. Based on a position or orientation of the at least one feature in the image data, the controller adjusts at least one of a position and an orientation of a desired view of the image data for display on the screen.

16 Claims, 5 Drawing Sheets

(51) Int. Cl.
    *B60R 1/00*    (2022.01)
    *H04N 5/232*   (2006.01)
    *G06V 10/44*   (2022.01)
    *G06V 20/56*   (2022.01)

(52) U.S. Cl.
    CPC ....... *H04N 5/232945* (2018.08); *H04N 7/183* (2013.01); *B60R 2300/605* (2013.01); *B60R 2300/8066* (2013.01)

(58) Field of Classification Search
    USPC .......................................................... 348/148
    See application file for complete search history.

(56) References Cited

U.S. PATENT DOCUMENTS

| | | | |
|---|---|---|---|
| 3,045,760 | A1 | 10/2011 | Stam et al. |
| 8,583,331 | B2 | 11/2013 | Stam et al. |
| 8,588,550 | B2 | 11/2013 | Liu |
| 9,073,493 | B1 | 7/2015 | Yun et al. |
| 2005/0225633 | A1 | 10/2005 | Diederiks et al. |
| 2005/0237385 | A1* | 10/2005 | Kosaka .................. G01B 11/00 348/42 |
| 2007/0263301 | A1 | 11/2007 | Agrest |
| 2010/0201814 | A1* | 8/2010 | Zhang .................. G06K 9/4647 348/148 |
| 2011/0037853 | A1 | 2/2011 | Shiraishi |
| 2013/0321629 | A1* | 12/2013 | Zhang .................. H04N 17/002 348/148 |
| 2013/0332034 | A1 | 12/2013 | Pierce et al. |
| 2014/0071308 | A1* | 3/2014 | Cieplinski ................ G06T 3/60 348/222.1 |
| 2014/0111637 | A1 | 4/2014 | Zhang et al. |
| 2014/0184799 | A1 | 7/2014 | Kussel |
| 2014/0277940 | A1 | 9/2014 | VanVuuren et al. |
| 2014/0313335 | A1 | 10/2014 | Koravadi |

FOREIGN PATENT DOCUMENTS

| | | |
|---|---|---|
| JP | 09052555 A * | 2/1997 |
| JP | 09052555 A | 2/1997 |
| JP | 2003295118 A | 10/2003 |
| JP | 2005332105 A | 12/2005 |

OTHER PUBLICATIONS

Korean Intellectual Property Office, "Notice to File a Response," Korean Patent Application No. 10-2017-7026953, dated Jan. 22, 2019 (25 pages).

Japan Patent Office, "Official Action," Japanese Patent Application No. 2017-549230, dated Dec. 3, 2018 (9 pages).

* cited by examiner

IMAGE PROCESSING FOR CAMERA BASED VEHICLE DISPLAY SYSTEM

CROSS-REFERENCE TO RELATED APPLICATION

This application claims priority to and the benefit under 35 U.S.C. § 119(e) of U.S. Provisional Patent Application No. 62/135,417, filed on Mar. 19, 2015, entitled "AUTO-LEVELING AND AUTO-AIMING OF IMAGE ON DISPLAY FOR CAMERA BASED DISPLAY SYSTEM," the entire disclosure of which is hereby incorporated herein by reference.

TECHNICAL FIELD

The present disclosure generally relates to a display system for a vehicle and more particularly to a display system providing a rearward view relative the vehicle.

SUMMARY

According to one aspect of the present disclosure, a display system for a vehicle is disclosed. The system comprises an imager configured to capture image data in a field of view rearward relative the vehicle. The system further comprises a display device and a controller. The display device comprises a screen disposed in a passenger compartment of the vehicle. The controller is in communication with the imager and the display device. The controller is operable to process the image data to identify at least one feature. Based on a position or orientation of the at least one feature in the image data, the controller adjusts at least one of a position and an orientation of a desired view of the image data for display on the screen.

According to another aspect of the present disclosure, a method for displaying a rearward directed field of view for a vehicle is disclosed. The method comprises capturing image data in the field of view and processing the image data to identify at least one feature. The method further comprises adjusting at least one of a position and an orientation of a desired view of the image data in response a position or orientation of the at least one feature in the image data. The desired view is displayed on a rearview display of the vehicle.

According to yet another aspect of the present disclosure, an apparatus for displaying a rearward directed field of view for a vehicle is disclosed. The apparatus comprises a display device comprising a screen disposed in a passenger compartment of the vehicle. The apparatus further comprises a controller in communication with the display device and an imager configured to capture image data in the field of view. The controller is operable to process the image data to identify at least one of a horizon and a vanishing point of a road. Based on a position or orientation of at least one of the horizon and the vanishing point, the controller is operable to adjust at least one of a position and an orientation of a desired view of the image data for display on the screen.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1:
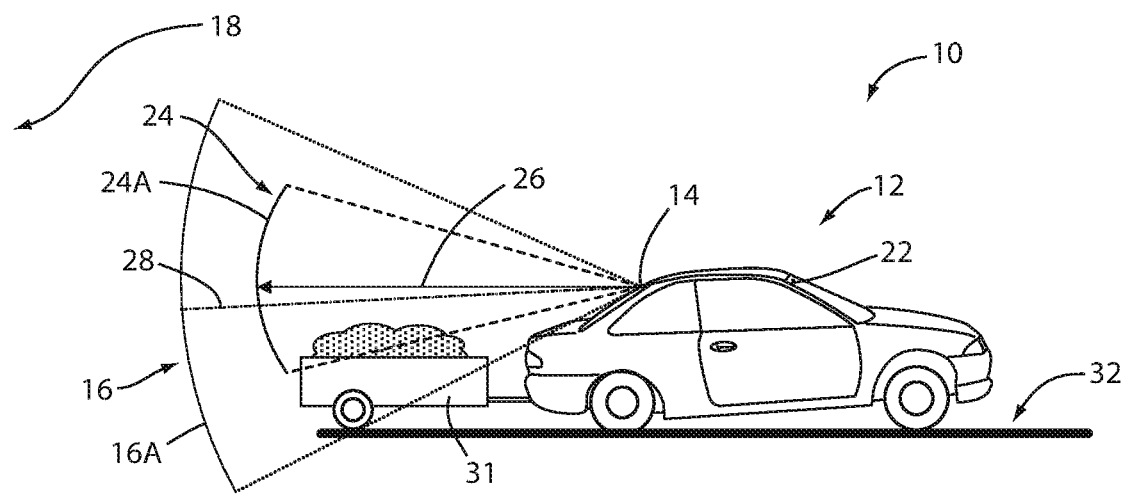
FIG. 1 is a diagram demonstrating a vehicle comprising a display system.

The present illustrated embodiments reside primarily in combinations of method steps and apparatus components related to an image sensor system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Figure 2:
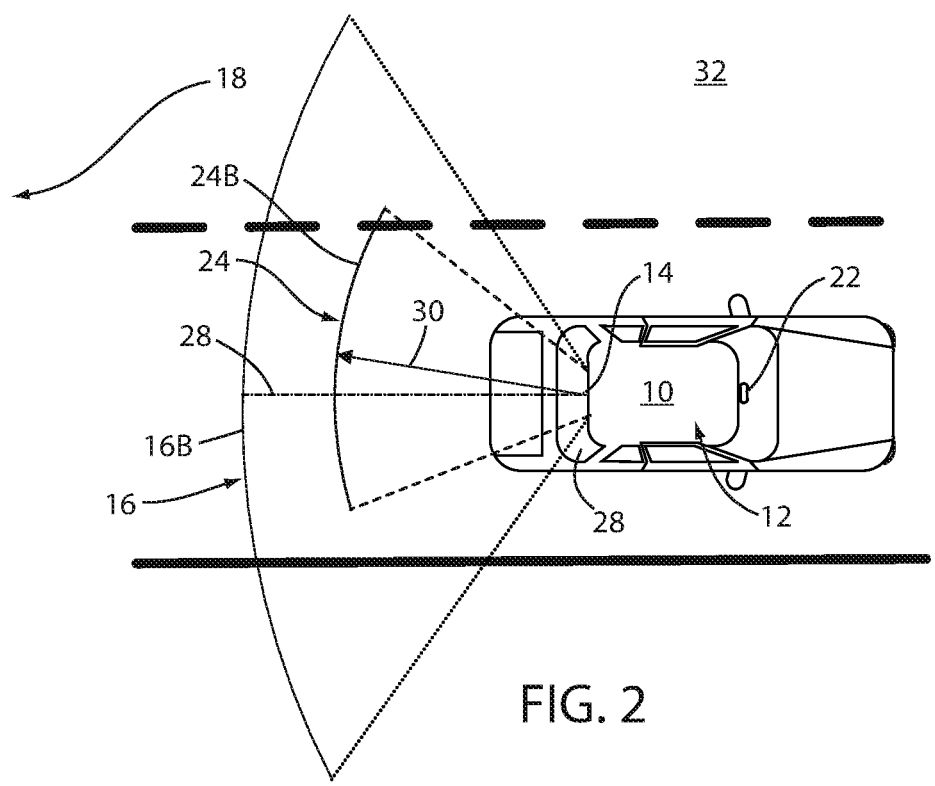
FIG. 2 is a diagram demonstrating a vehicle comprising a display system.

Referring to FIGS. 1 and 2, a vehicle 10 is shown equipped with a display system 12. The display system 12 comprises an imager 14 configured to capture a field of view 16 corresponding to a scene 18. The field of view 16 comprises a vertical component 16A and a horizontal component 16B. The imager 14 is configured to capture image data corresponding to the field of view 16 and display the image data on a display device 22. The display device 22 is operable to adjust a desired view 24 or optimal view of the image data as it is displayed on a screen of the display device 22. The desired view 24 may be identified by a controller of the display system 12 based on at least one image analysis technique, and in some embodiments may further incorporate a user preference to optimize the image data for display on the display device 22. The desired view 24 may correspond to a repositioned, scaled, cropped, and or proportionally adjusted view of the image data to be displayed on the display device.

The display device 22 may correspond to a rear view display device configured to provide a rearward directed view relative the vehicle 10. In this configuration, the display system 12 is operable to display a series of images captured corresponding to scenes behind the vehicle 10. The imager 14 is in communication with a controller and comprises a pixel array configured to capture the image data in the form of pixel information. In the various implementations discussed herein, the display system 12 is configured to process the image data captured by the imager 14 and apply at least one image analysis technique to identify and display the desired view 24.

Referring to FIG. 1, the side view of the vehicle 10 is shown illustrating the vertical component 16A of the field of view 16. A vertical component 24A of the desired view 24 is shown corresponding to a portion of the vertical component 16A of the field of view 16. The desired view 24 may comprise a vertical offset 26 demonstrated as an angular offset from a central focal point 28 of the field of view 16 of the imager 14. The central focal point 28 may correspond to a center of the vertical component 16A and the horizontal component 16B of the field of view 16.

Referring to FIG. 2, the top view of the vehicle 10 is shown illustrating the horizontal component 16B of the field of view 16. A horizontal component 24B of the desired view 24 is shown corresponding to a portion of the horizontal component 16B. A horizontal offset 30 is demonstrated as an angular offset from the central focal point 28 of the field of view 16.

As demonstrated in FIGS. 1 and 2, the vertical and horizontal offsets 26 and 30 may be applied based on at least one of a user preference and in response one or more features identified in the image data. As an example, the vertical offset 26 is shown offsetting the image data in the vertical direction such that the image data is consistently displayed in reference to a vertical reference in the image data. In this case, the offset may be applied at least in part to correct the angle of the imager 14 due to a trailer 31 weighing down a rear portion of the vehicle 10. The horizontal offset may be applied based on at least one of a vanishing point of a road 32 and/or a horizon identified in the image data, and a user preference. Additionally, the controller may be operable to identify and apply a rotational offset to the image data to display the desired view 24 as further discussed herein.

In some embodiments, changes in the vertical component 24A and/or the horizontal component 24B of the desired view 24 may result due to fluctuations or variations in a surface of the road 32 (e.g. undulations, potholes, speed-bumps, etc.). Under such circumstances, the controller may be configured to identify and/or track at least one feature in the image data. Based on the at least one feature, the controller may adjust the position and/or orientation of a desired view 24 to stabilize the appearance of the desired view 24 in the image data. For example, if the controller identifies movement of the at least one feature in the image data from a first frame to a second frame, the controller may adjust the vertical offset 26 and/or the horizontal offset 30 to account for the movement of the at least one feature.

Figure 3:
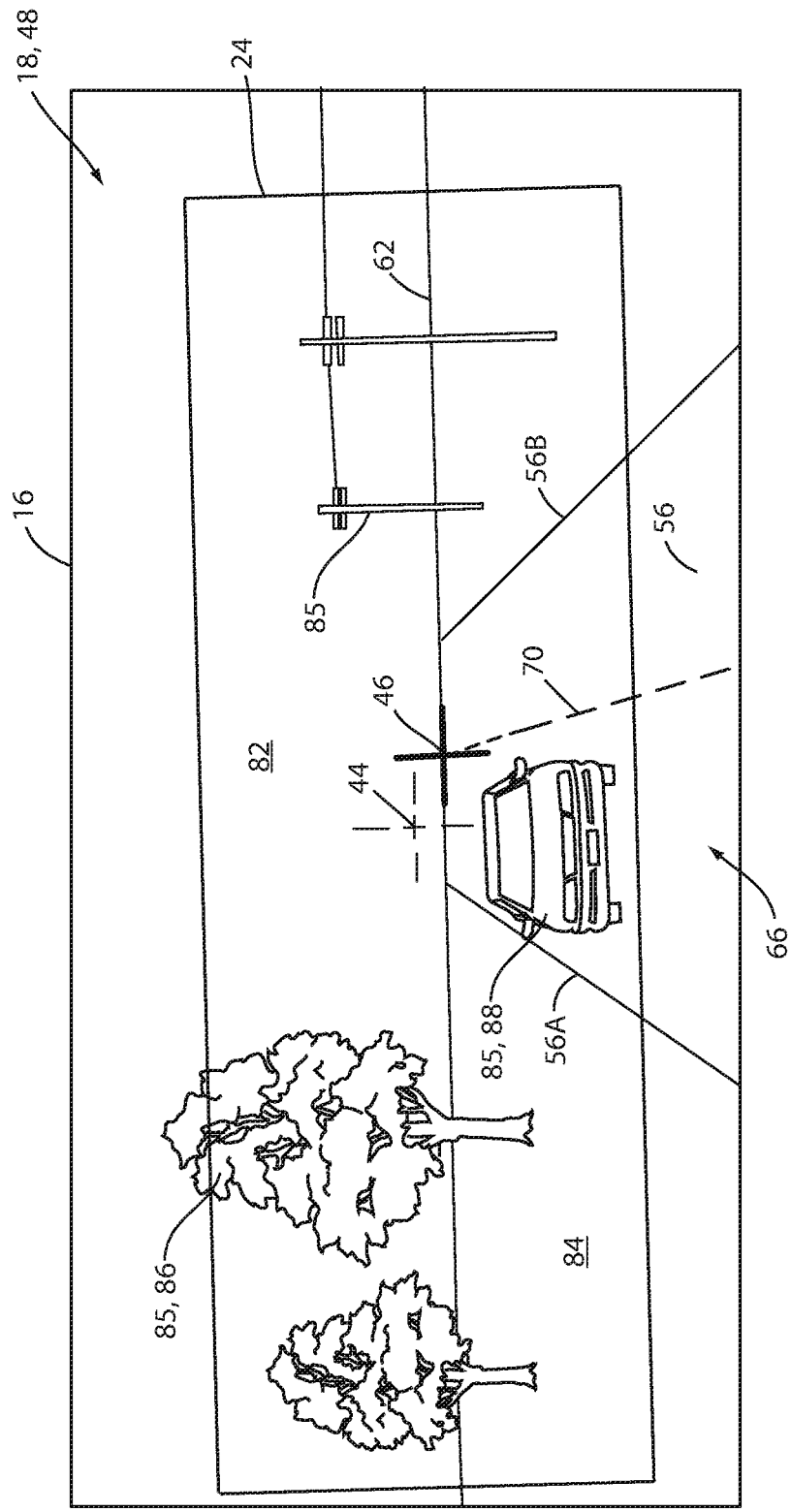
FIG. 3 is a diagram of image data corresponding to a scene captured by an imager of a display system.
Figure 4:
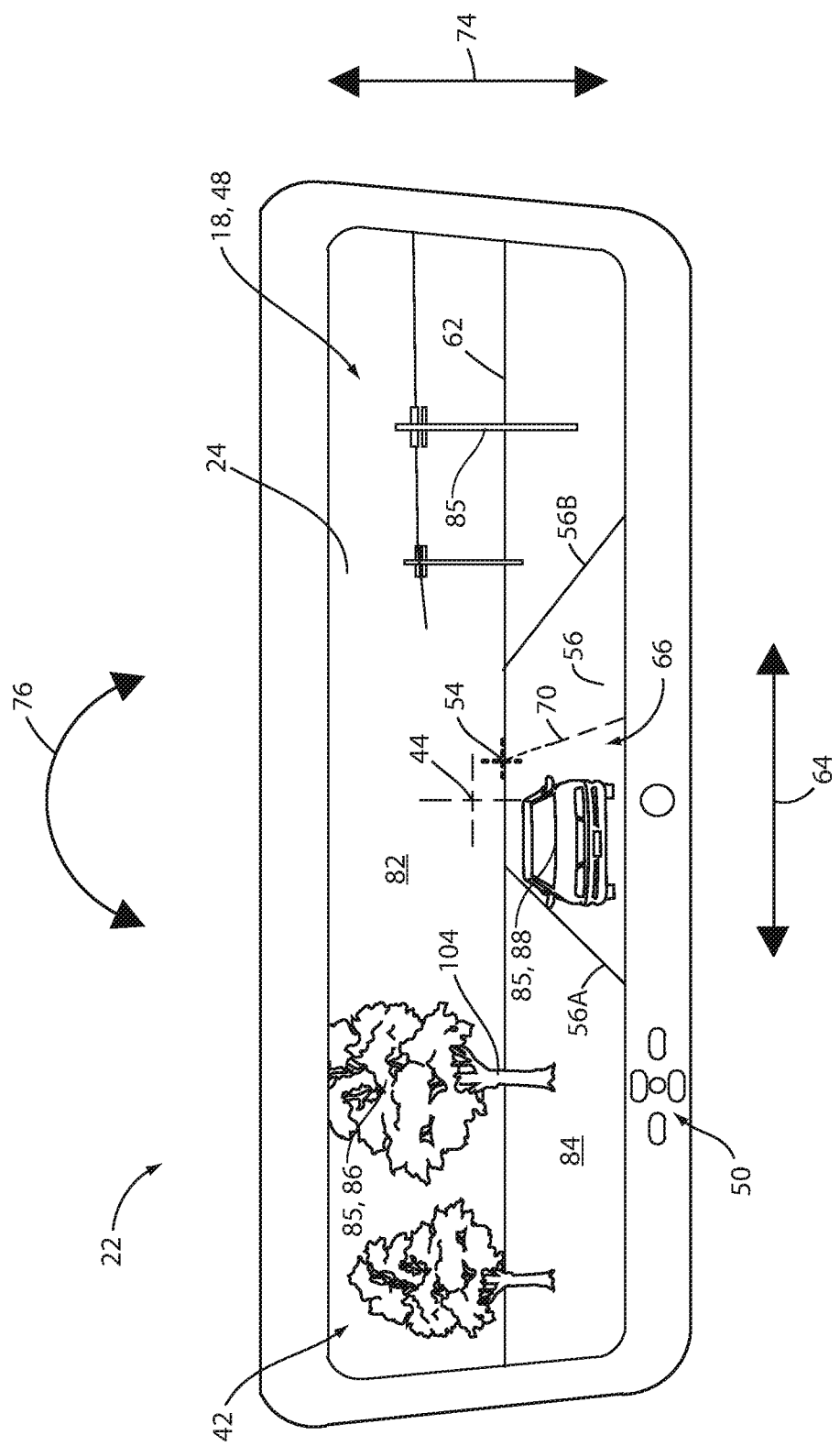
FIG. 4 is a front view of a display device configured to adjust image data captured by an imager to display a desired or optimal view of the image data.

Referring now to FIGS. 3 and 4, the field of view 16 and the desired view 24 of the image data captured by the imager 14 are shown. FIG. 3 demonstrates the image data captured corresponding to the field of view 16. The desired view 24 is shown as a portion of the image data displayed in FIG. 3. The desired view is also shown in FIG. 4 displayed on a screen 42 of the display device 22.

The desired view 24 is shown having a central reference point 44 in relation to a detected vanishing point 46 identified in the image data 48. The central reference point may correspond to the central focal point 28 of the field of view 16. The desired view 24 and the central reference point 44 may be defined via an input into an interface 50 of the display device 22. The central reference point 44 may be defined as a user preference, which may be stored in a memory of the controller as a display offset relative to the display center point 54. In this configuration, an operator of the vehicle 10 may set at least one user preference defining the desired view 24. The desired view 24 may be defined as a relative horizontal position, vertical position, and rotation of the desired view 24 in reference to the vanishing point 46 of a road 56, a horizon 62, and a variety of features that may be identified in the image data 48. The interface 50 may be implemented by a variety of user inputs and/or controls that may be local to the display device 22 and/or in communication with a controller of the display device 22. For example, the display system 12 and the interface 50 may be implemented or embody any of the elements or features discussed in U.S. Pat. No. 10,455,143 entitled "VEHICLE DISPLAY WITH VIEW CONTROL", which is incorporated herein by reference in its entirety.

For example, the controller may utilize a horizontal location of the vanishing point 46 in the image data 48 to identify a shift in a horizontal position of the vanishing point 46. The shift in the horizontal position of the vanishing point 46 in a current frame of the image data 48 may be compared to a horizontal position of the vanishing point 46 in the desired view 24 to determine a horizontal offset 64 of the desired view relative to the central reference point 44. Additional features such as a position of an approximate center 66 of the road 56, a center line 70 of the road 56, at least one side 56A and 56B of the road 56, etc. may similarly be utilized by the controller to determine the horizontal offset 64 of the image data to achieve the desired view 24.

The controller may utilize a vertical location of the horizon 62, identified in the image data 48, to identify a shift in a vertical position of the horizon 62. The shift in the vertical position of the horizon 62 in a current frame of the image data 48 may be compared to a vertical position of the horizon 62 in the desired view 24 to determine a vertical offset 74 of the desired view 24 relative to the central reference point 44. Additional features such as the vanishing point 46, and various features that may be identified in the image data 48, may be similarly utilized by the controller to determine the vertical offset 74 of the image data 48 to achieve the desired view 24.

The controller may also utilize a relative angle or slope of the horizon 62, identified in the image data 48, to identify a rotational shift of the horizon 62. The rotational shift of the horizon 62 may be compared to a rotational position or orientation of the horizon 62 in the desired view 24 to determine a rotational offset 76 of the desired view 24. Additional features such as a position of the center line 70 of the road 56, at least one side 56A and 56B of the road 56, etc. may similarly be utilized by the controller to determine the rotational offset 76 of the image data 48 to achieve the desired view 24.

The controller may be configured to utilize various algorithms and methods to identify features in the image data. For example, the controller may be configured to utilize an adaptive edge detection process to identify the lanes and portions of the road 56 in order to identify the vanishing point 46. Additionally, the controller may be configured to utilize a boundary contrast algorithm to detect the horizon 62 by detecting a gradient threshold of a series of pixel values of the image data 48. Though particular image processing methods are discussed herein, the methods are introduced for explanation and not limitation. As such, the disclosure shall not be limited to such exemplary embodiment unless expressly stated otherwise.

The adaptive edge detection process may utilize an edge detection mask to approximate a gradient at pixel locations in the image data. If a pixel meets predetermined criteria for an intensity value and a gradient threshold value, the controller may identify the pixels as a candidate lane line pixel. As the image data corresponding to a current frame captured by the imager 14 is processed, the candidate lane line pixels are utilized to generate a best-fit polynomial to model a lane line of the road 56. In some embodiments, the best-fit polynomial may correspond to a third order polynomial. In this way, the candidate lane line pixels may be utilized to generate a left lane line model 56A and a right lane line model 56B which may correspond to sides of the road 56. The left lane line model 56A and the right lane line model 56B model may be used to determine the intersection point of the sides of the road 56, which may correspond to the vanishing point 46 in the image data.

The controller may utilize the horizon boundary contrast algorithm to detect groups of pixels in the image data in order to identify the horizon 62. Each of the groups of pixels may correspond to portions or patches of contiguous pixels in the image data 48 that contain the boundary between a sky portion 82 and a ground portion 84 of image data 48. The horizon boundary contrast algorithm may analyze the contrast between the sky portion 82 and the ground portion to determine a location of the horizon 62. The contrast may be analyzed by calculating a pixel intensity vertically in the image data to determine a vertical gradient. The vertical gradient captures the difference in intensity or pixel values of the pixels corresponding to the sky portion 82 and those corresponding to the ground portion 84. By identifying the boundary of the sky portion 82 and the ground portion 84, the controller may be operable to identify the horizon 62 in the image data 48.

In some embodiments, the controller may identify various features of the image data to stabilize and/or limit variations in the position of the vertical component 24A and or the horizontal component 24B. For example, the controller may be configured to detect one or more features 85 or objects in the image data. The features may correspond to the horizon 62, the vanishing point 46, a tree 86, a street sign, a vehicle 88, and any form of object that may be detected by the controller in a plurality of image frames of the image data. In this way, the controller may be configured to detect a variety of objects in the image data to adjust for changes in the vertical component 24A and/or the horizontal component 24B of the desired view. Such changes may be in response to rapid or gradual changes in the scene 18 relative to the field of view 16.

In some embodiments, changes in the vertical component 24A and/or the horizontal component 24B of the desired view 24 may result due to fluctuations in a surface of the road 32 (e.g. undulations, potholes, speedbumps, etc.). Under such circumstances, the controller may be configured to identify and/or track at least one feature in the image data from a first frame to a later frame. Based on the at least one feature, the controller may adjust the position and/or orientation of a desired view 24 to stabilize the appearance of the desired view 24 in the image data. In an exemplary embodiment, the controller may be operable to detect one or more objects (e.g. the tree 86, the vehicle 88, etc.) to determine and adjust the vertical offset 26 and/or the horizontal offset 30 to account for the movement of the at least one object. In such embodiments, the one or more objects may be utilized selectively by the controller to offset the desired view 24 in response to one or more of the vanishing point 46 and the horizon 62 being undetectable in the image data.

Systems demonstrating various detection techniques that may be implemented in the display system 12 are further discussed in detail in U.S. Pat. No. 9,767,695 entitled "STAND ALONE BLIND SPOT DETECTION SYSTEM," filed on Jul. 11, 2013, by Steven G. Hoek et al.; U.S. Pat. No. 8,924,078, entitled "IMAGE ACQUISITION AND PROCESSING SYSTEM FOR VEHICLE EQUIPMENT CONTROL," filed on Oct. 17, 2011, by Oliver M. Jeromin et al.; U.S. Pat. No. 8,577,169, entitled "DIGITAL IMAGE PROCESSING AND SYSTEMS INCORPORATING THE SAME," filed on Feb. 1, 2010, by Jeremy C. Andrus et al.; U.S. Pat. No. 8,065,053 B2, entitled "IMAGE ACQUISITION AND PROCESSING SYSTEMS FOR VEHICLE EQUIPMENT CONTROL," filed on Jan. 31, 2011, by Joseph S. Stam et al.; and U.S. Pat. No. 8,543,254 B1, entitled "VEHICULAR IMAGING SYSTEM AND METHOD FOR DETERMINING ROADWAY WIDTH," filed Mar. 28, 2012, by Jeremy A. Schut et al., which are incorporated by reference herein in their entirety.

Figure 5:
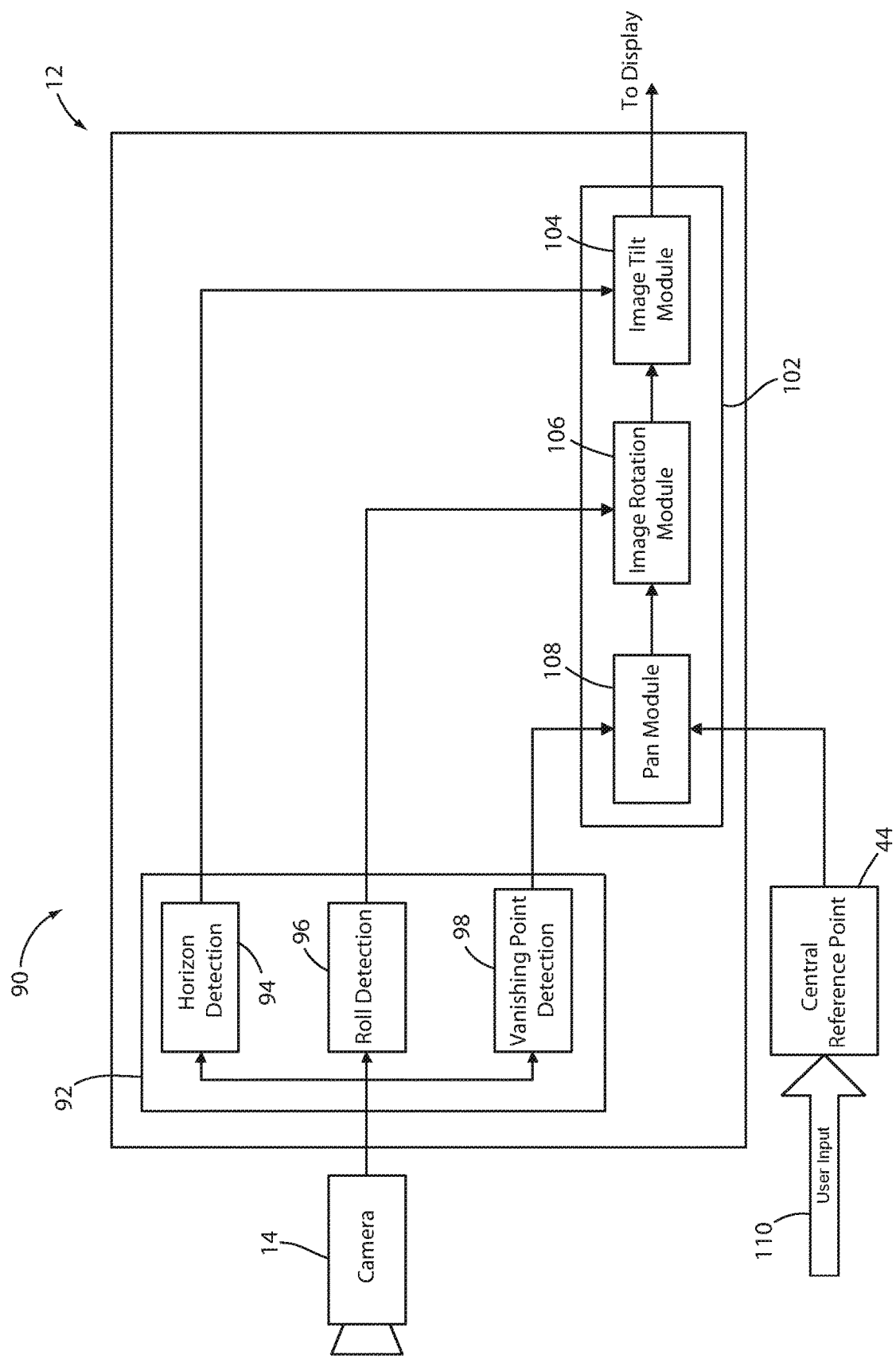
FIG. 5 is a process diagram demonstrating a method to adjust image data for display by a display system.

Referring now to FIG. 5, a flow chart 90 is shown demonstrating a method to adjust the image data 48 for display by the display system 12. The method may begin by capturing the image data 48 via the imager 14 and communicating the image data 48 to the controller. At least one processor of the controller may be configured to complete one or more image processing steps 92 on the image data 48 to determine the vanishing point 46, the horizon 62, or any other features that may be identified in the image data 48. The features identified in the image data 48 may be utilized by the processor to identify at least one of the horizontal offset 64, the vertical offset 74, and the rotational offset 76 of the desired view 24.

The one or more image processing steps 92 may include a horizon detection step 94, a roll detection step 96 and a vanishing point detection step 98. Based on the features identified by the processor in the image processing steps 92, the processor may further be operable to correct the image data in one or more image correction steps 102 such that an orientation of the image data is aligned with the desired view 24. The one or more processors may comprise one or more modules configured to process the image correction steps 102. The modules may comprise a tilt module 104, a rotation module 106, and a pan module 108.

The horizon detection step 94 may be configured to detect the horizon 62 of the image data 48. The tilt module 104 of the at least one processor may utilize a vertical location of the horizon 62, identified in the image data 48, to apply a shift in a vertical position of the horizon 62 in a current frame of the image data 48. The shift in the vertical position of the horizon 62 may be compared to a vertical position of the horizon 62 in the desired view 24 to determine the vertical offset 74 of the desired view 24 relative to the central reference point 44. Additional features such as the vanishing point 46, and various features that may be identified in the image data 48, may similarly be utilized by the controller to determine the vertical offset 74 of the image data to achieve the desired view 24.

The roll detection step 96 may be configured to identify a relative angle of the horizon 62 in the image data 48, to identify a rotational shift of the field of view 16. The rotation module 106 of the one or more processors may then identify the rotational shift of the horizon 62 by comparing a rotational position of the horizon 62 in the desired view 24 to determine the rotational offset 76 of the desired view 24. Additional features such as a position of the center line 70 of the road 56, at least one side 56A and 56B of the road 56, etc. may similarly be utilized by the one or more processors to determine the rotational offset 76 of the image data to achieve the desired view 24.

The vanishing point detection step 98 may process the image data to determine at least a horizontal location of the vanishing point 46 in the image data 48. The pan module 108 of the one or more processors may then identify the shift in a horizontal position of the vanishing point 46 in a current frame of the image data 48. The shift in the horizontal position of the vanishing point 46 may be compared to a horizontal position of the vanishing point 46 in the desired view 24 to determine the horizontal offset 64 of the desired view 24 relative to the central reference point 44. Additional features such as a position of an approximate center 66 of the road 56, a center line 70 of the road 56, at least one side 56A and 56B of the road 56, etc. may similarly be utilized by the one or more processors to determine the horizontal offset 64 of the image data to achieve the desired view 24.

After the image correction steps 102 are complete, the controller may output the optimal or the desired view 24 of the image data 48 to the display device 22. As discussed previously, the display device 22 may comprise the interface 50 configured to receive at least one input to configure the position and scale of the desired view 24 and/or the central reference point 44 in a user input step 110. The desired view 24 and the reference point 44 may be defined as a user preference, which may be stored in the memory of the controller as proportions of the image data and a display offset relative to the display center point 54. In this configuration, an operator of the vehicle 10 may set at least one user preference defining the desired view 24. The desired view 24 may be defined as a relative horizontal position, vertical position, and rotation of the desired view 24 in reference to the vanishing point 46 of a road 56, a horizon 62, and a variety of features that may be identified in the image data 48.

Figure 6:
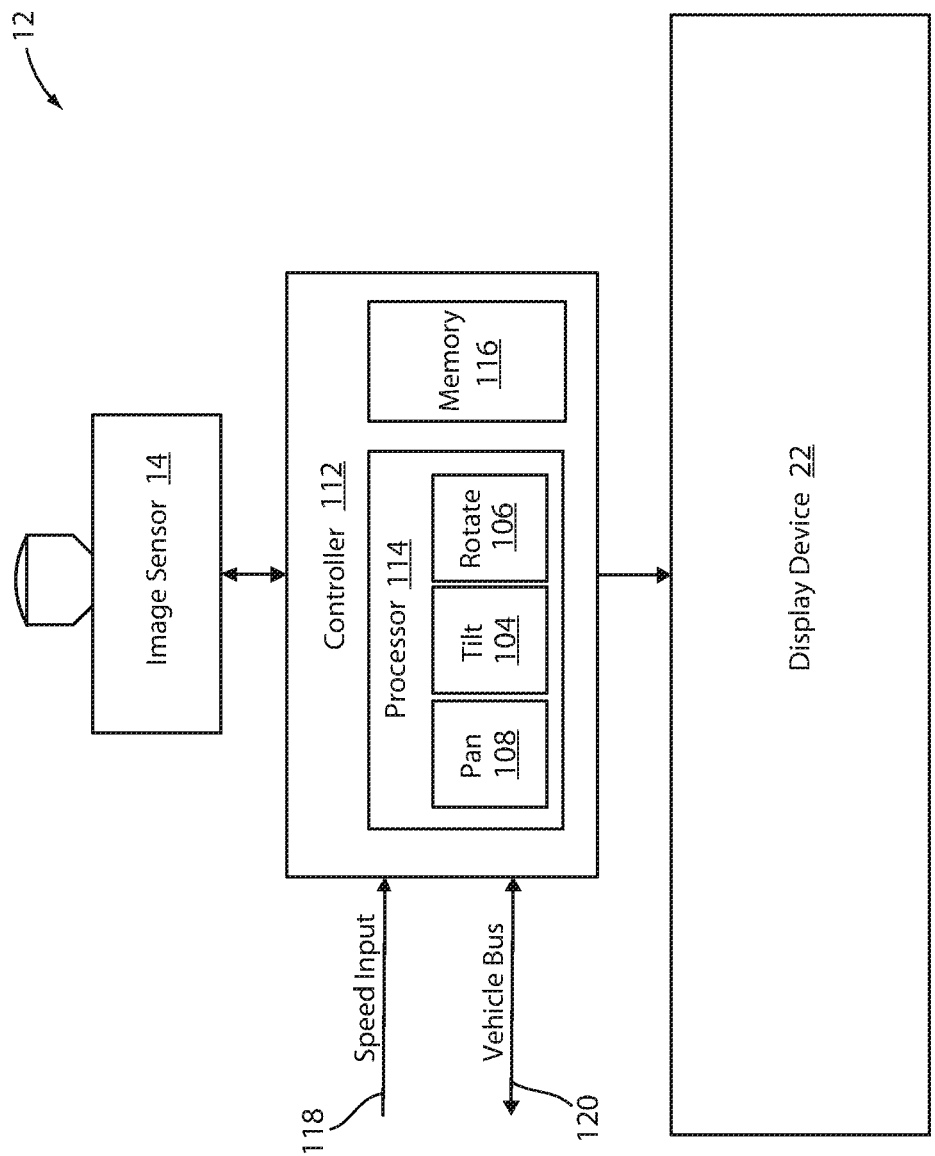
FIG. 6 is a block diagram of the display system in accordance with the disclosure.

Referring now to FIG. 6, a block diagram of the display system 12 is shown. The imager 14 is shown in communication with the controller 112. A pixel array of the imager 14 may correspond to a CMOS image sensor, for example a CMOS active-pixel sensor (APS) or a charge coupled device (CCD). Each of the pixels of the pixel array may correspond to a photo-sensor, an array of photo-sensors, or any grouping of sensors configured to capture light. The controller 112 may comprise a processor 114 operable to process the image data 48 as supplied in analog or digital form in the imager 14. For example, the controller 112 may be implemented as a plurality of processors, a multicore processor, or any combination of processors, circuits, and peripheral processing devices. The processor may comprise a plurality of modules configured to process and/or correct the image data 48. The modules may comprise a tilt module 104, a rotate module 106, and a pan module 108.

The controller 112 may further comprise a memory 116. The memory 116 may comprise various forms of memory, for example, random access memory (RAM), dynamic RAM (DRAM), synchronous DRAM (SDRAM), and other forms of memory configured to store digital information. The memory 116 may be configured to store the image data 48 for processing. Processing the image data 48 may comprise scaling and cropping the image data 48 to adjust a position and apparent size of the image data 48 as it is output to a screen of the display device 22. The display device 22 comprises a screen operable to display the desired view 24. The screen may correspond to any form of display, for example a light emitting diode (LED) display, liquid crystal display (LCD), organic LED (OLED) display, etc. In some embodiments, the memory 116 may further be configured to store a plurality of user profiles corresponding to a plurality of desired views. Each of the desired views may comprise a specific vertical offset, horizontal offset, and rotational offset that may be recalled by the controller 112 in relation to a particular operator of the vehicle 10.

The controller 112 may be in communication with a plurality of inputs for example, a speed input 118 and a vehicle bus 120. The speed input 118 provides a signal communicating a speed of the vehicle 10 via a speedometer or any device operable to measure and communicate data corresponding to the speed of a vehicle 10. The vehicle bus 120 may be implemented using any suitable standard communication bus, such as a Controller Area Network (CAN) bus. The vehicle bus 120 may be configured to provide a variety of additional information to the controller 112.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A display system for a vehicle comprising:
   an imager configured to capture image data in a plurality of image frames in a fixed field of view rearward relative to the vehicle;
   a display device comprising a screen disposed in a passenger compartment of the vehicle; and
   a controller comprising a memory and in communication with the imager and the display device, wherein the controller is configured to:
   receive a user input defining a position of a desired view of the image data on the screen in a first frame of the image data;
   detect a location of at least one feature in the image data in the desired view;
   identify a user-defined offset relative to the at least one feature in the image data in the desired view;
   store the user-defined offset for the image data identified in the first image frame in the memory, wherein the user-defined offset is defined relative to at least one of a first position and a first orientation of at least one feature identified in the image data;

process the image data in a second image frame, wherein the second image frame is captured at a later time than the first image frame;

identify at least one of a second position and a second orientation of the at least one feature in the second image frame;

compare at least one of the first position and the first orientation to the second position and the second orientation;

identify a change in at least one of second position and second orientation of the at least one feature relative to the at least one of the first position and the first orientation;

access the user-defined offset in the memory;

generate an output image by adjusting the image data according to the user-defined offset altering at least one of a display position and a display orientation in the image data received from the imager in response to the change in the position and the feature orientation; and display the output image on the screen.

2. The display system according to claim 1, wherein the display device corresponds to a rear-view display device.

3. The display system according to claim 1, wherein the at least one feature comprises a vanishing point of a road identified in the image data based on an intersection of a plurality of lane lines detected in the image data.

4. The display system according to claim 3, wherein the vanishing point is utilized to offset at least one of a horizontal position and a vertical position of the user-defined offset.

5. The display system according to claim 1, wherein the user-defined offset corresponds to an offset of a vertical component and a horizontal component of the image data.

6. A method for displaying a rearward directed field of view for a vehicle, the method comprising:

receiving an input defining a desired view of image data on a screen of a display device;

detecting a location of at least one feature in the image data;

identifying a user-defined offset relative to the at least one feature in the image data;

storing the user-defined offset for the image data, wherein the user-defined offset is defined relative to the at least one feature identified in the image data;

capturing image data in the field of view, wherein the field of view is fixed in orientation relative to the vehicle;

processing the image data to identify the at least one feature;

accessing the user-defined offset in the memory;

adjusting a portion of the image data for display according to a change in the location of the at least one feature and based on the user-defined offset relative to the position of the at least one feature thereby generating the desired view of the image data; and displaying the desired view on a rear-view display of the vehicle.

7. The method according to claim 6, wherein the at least one feature comprises a vanishing point of a road and a horizon identified in the image data.

8. The method according to claim 7, wherein the adjusting comprises offsetting at least one of a horizontal position and a vertical position of the user-defined offset based on a location of the vanishing point in the image data.

9. The method according to claim 7, wherein the adjusting comprises offsetting a rotational orientation of the user-defined offset based on an angle of the horizon in the image data.

10. An apparatus for displaying a rearward directed field of view having a fixed orientation for a vehicle, the apparatus comprising:

a display device comprising a screen disposed in a passenger compartment of the vehicle;

a controller in communication with the display device and an imager configured to capture image data in the field of view, wherein the controller is operable to:

receive an input defining a desired view of the image data on the screen of the display device;

detect a location of at least one feature in the image data in the desired view;

identify a user-defined offset relative to the at least one feature in the image data;

store the user-defined offset for the image data, wherein the user-defined offset is defined relative to the at least one feature identified in the image data;

process the image data identifying the at least one feature in the image data;

access the user-defined offset in the memory;

adjust at least one of a display position and a display orientation of a desired view of the image data based on the user-defined offset, wherein the desired view is generated by the controller in response to a change in the position of the at least one feature identified in the image data; and display the desired view on the screen.

11. The apparatus according to claim 10, wherein the controller is configured to adjust an angular orientation of the desired view based on a slope of a horizon in the image data.

12. The apparatus according to claim 10, wherein the controller is configured to adjust a linear position of the desired view based on a position of a vanishing point.

13. The apparatus according to claim 10, wherein the controller is configured to adjust the desired view in the image data relative to a central focal point of the field of view in response to an input.

14. The system according to claim 3, wherein the lane lines are identified based on a plurality of candidate pixels identified in the image data.

15. The system according to claim 14, wherein the controller is further configured to:

generate a lane line model based on the candidate pixels; and calculate the intersection of the lane lines based on the lane line model.

16. The system according to claim 15, wherein the lane line model is a best fit polynomial model.

* * * * *